(12) United States Patent
Shimizu

(10) Patent No.: US 6,804,789 B2
(45) Date of Patent: Oct. 12, 2004

(54) METHOD OF STOPPING AN OPERATION, MAINTAINING THE NETWORK CONNECTION OF THE DATA TERMINAL, AND WARNING THE USER IN RESPONSE TO A LOW-VOLTAGE CONDITION

(75) Inventor: Hirokimi Shimizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 09/795,132

(22) Filed: Mar. 1, 2001

(65) Prior Publication Data

US 2001/0019964 A1 Sep. 6, 2001

(30) Foreign Application Priority Data

Mar. 3, 2000 (JP) ........................................ 2000-059658
Feb. 2, 2001 (JP) ........................................ 2001-026895

(51) Int. Cl.[7] .............................................. G06F 1/28
(52) U.S. Cl. ..................... 713/300; 340/636.1; 455/572
(58) Field of Search ....................... 713/300; 340/636.1; 455/572

(56) References Cited

U.S. PATENT DOCUMENTS 4,509,201 A * 4/1985 Sekigawa et al. ........... 455/572
5,392,462 A * 2/1995 Komaki .................... 455/552.1
5,905,437 A * 5/1999 Takahashi ................ 340/636.1
6,173,170 B1 * 1/2001 Komoda ..................... 455/407

* cited by examiner

Primary Examiner—Thomas Lee
Assistant Examiner—P. Chandrasekhar
(74) Attorney, Agent, or Firm—Fitzpatrick, Cella, Harper & Scinto (57) ABSTRACT

It is an object to provide a data terminal which can give a surplus for switching a power supply to an AC adapter and continuing communication without exerting an adverse influence on the server side when a battery voltage of a data terminal drops to the user. To accomplish this object, a microcomputer in an adapter connected to a communication network via a cellular phone or PHS discriminates an operating mode of the adapter when the low-power voltage is detected by an interruption signal from a power supply during the connection of communication with an image server connected to the communication network. While data from the image server is being received or the received data is being printed, the microcomputer waits for seconds while expecting a recovery of the power voltage. If the power supply is exchanged to a new battery or the AC adapter is inserted by the operator during this period of time, the printing operation is resumed.

11 Claims, 9 Drawing Sheets

METHOD OF STOPPING AN OPERATION, MAINTAINING THE NETWORK CONNECTION OF THE DATA TERMINAL, AND WARNING THE USER IN RESPONSE TO A LOW-VOLTAGE CONDITION

BACKGROUND OF THE INVENTION

1. Field of the Invention

The invention relates to a data terminal which is connected to an information processing apparatus such as a server or the like through a communication line and receives data and processes it and to a data processing method, a data processing system, and a memory medium for such a data terminal.

2. Related Background Art

In recent years, a radio public telephone network has been established and the number of users of cellular phones and PHSs has been increasing. The realization of advanced functions of the radio public telephone network, cellular phones, and PHSs is being progressed and they have not only a voice talking function but also a data communicating function. Further, various data distributing services using those cellular phones and PHSs with the data communicating function are being provided.

In the data distributing services, a data terminal corresponding to the service is connected to the cellular phone or PHS and processes are executed. Since the data terminal is used in a portable environment, it is driven by a battery. The data terminal also has a power input terminal as a spare power supply from an AC adapter.

In the conventional data processing system, nothing is considered with respect to the operation stop due to a low-battery voltage of the data terminal. If the battery voltage of the data terminal drops to an operation guarantee level or less, a resetting circuit operates and the operation of the data terminal stops suddenly. On the server side, when a response from the data terminal is not made for a predetermined time interval, it is determined that the data terminal is abnormal, so that a line is disconnected and a distributing process is stopped.

In the conventional data processing system, however, in order to cope with a possibility that the operation of the data terminal stops suddenly, it is necessary to assemble a process for such a case into a program on the server side.

The assembling operation of such a corresponding process makes the program on the server side complicated, stops the server side program at an unexpected timing, or the like, so that there is a fear that the server side program is adversely influenced.

In spite of the fact that the operation of the data terminal is stopped due to the low-battery voltage, the line is held in a connecting state for a period of time until the server determines the abnormality of the data terminal, so that a communication fee is wastefully charged and, further, the communication line is not effectively used.

Further, even in an environment such that an AC adapter is used and an AC power supply can be used, if the operation of the data terminal stops suddenly due to the low-battery voltage, the reception of data has to be retried, the communication fee is wasted, and time is wastefully consumed.

SUMMARY OF THE INVENTION

It is, therefore, an object of the invention to provide a data terminal, a data processing method, a data processing system, and a memory medium, in which when a battery voltage of the data terminal drops, a surplus time suitable for continuing communication by exchanging the battery to a new one or switching to an AC adapter can be given to the user without exerting an adverse influence on the server side.

To accomplish the above object, according to the first aspect of the invention, there is provided a data terminal which is connected to an information processing apparatus through a communication line and processes data, comprising: voltage detecting means for detecting a low-power voltage of the data terminal during communication with the information processing apparatus; and standby means for waiting for a predetermined time when the low-power voltage is detected.

DETAILED DESCRIPTION OF THE PREFERRED EMBODIMENTS

Embodiments of a data terminal, a data processing method, a data processing system, and a memory medium according to the invention will be described.

[First Embodiment]

Figure 1:
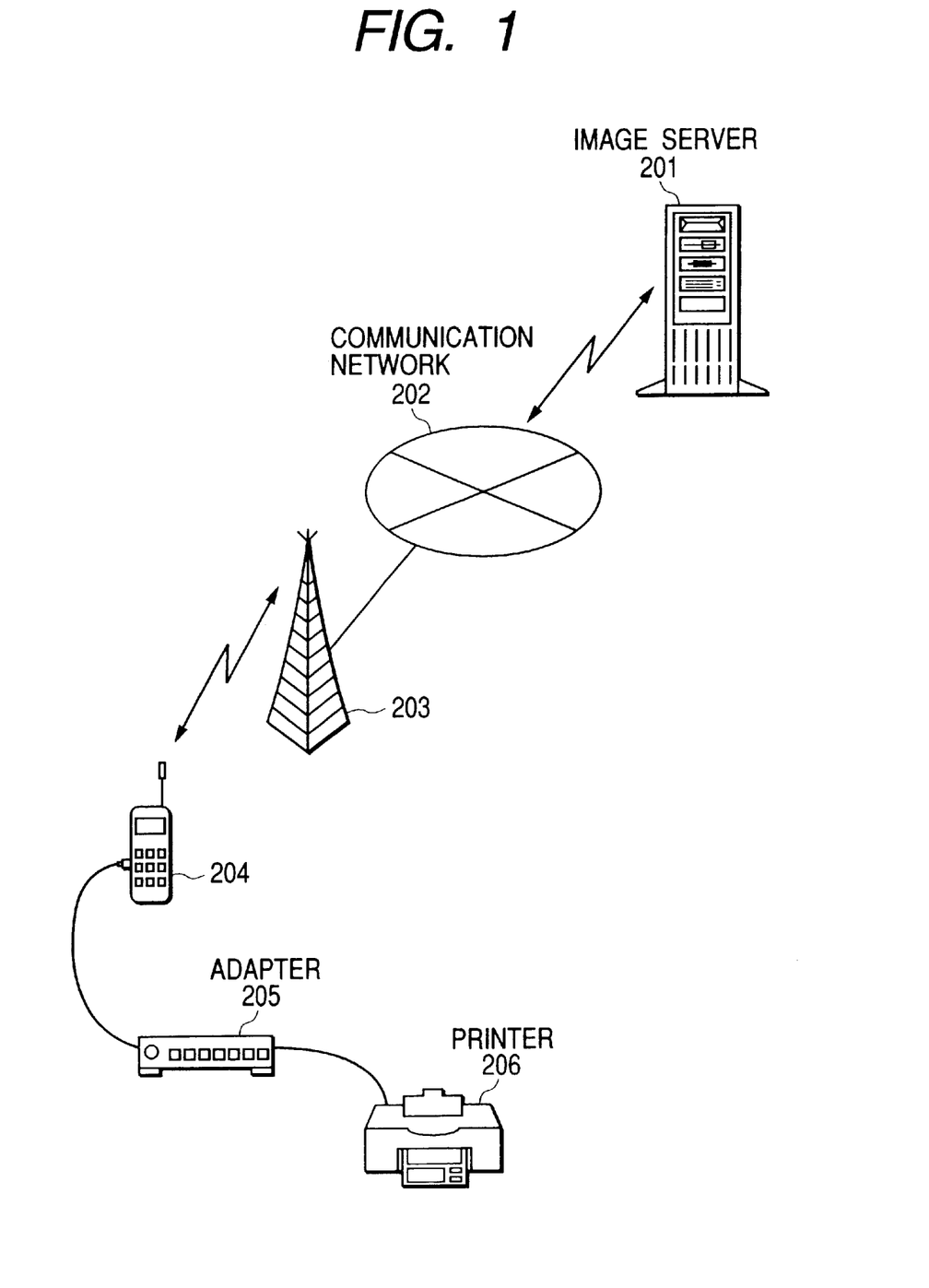
FIG. 1 is a diagram showing a construction of an image distributing system in the first embodiment.

According to the first embodiment, the data processing system is applied to an image distribution print system. FIG. 1 is a diagram showing a construction of the image distribution print system in the first embodiment.

In the diagram, reference numeral 201 denotes an image server for distributing image data; 202 a communication network; 203 a radio public telephone network; 204 a PHS as a communication terminal; 205 an adapter as a data terminal; and 206 a printer for printing the received image data.

In the image distribution print system, services are provided by using the radio public telephone network 203 and PHS 204 so that a desired image can be printed in a mobile environment.

The image server 201 has a Web page for providing services and can access to the Web page from a PDA or the like (not shown) via the PHS 204 and radio public telephone network 203, select desired image data, and instruct distribution of it to the printer 206 on the user side.

The image server 201 searches user information which has previously been registered, obtains a type of printer 206 which is used by the user, and converts a designated image into printer data adapted to the printer type. Further, the server 201 obtains a telephone number of the PHS 204 connected to the printer 206 via the adapter 205, calls the telephone number, and transmits the converted print data on the basis of the user information. The adapter 205 buffers the printer data received from the image server 201 through the PHS 204, interface converts it, and transfers it to the printer 206.

Figure 2:
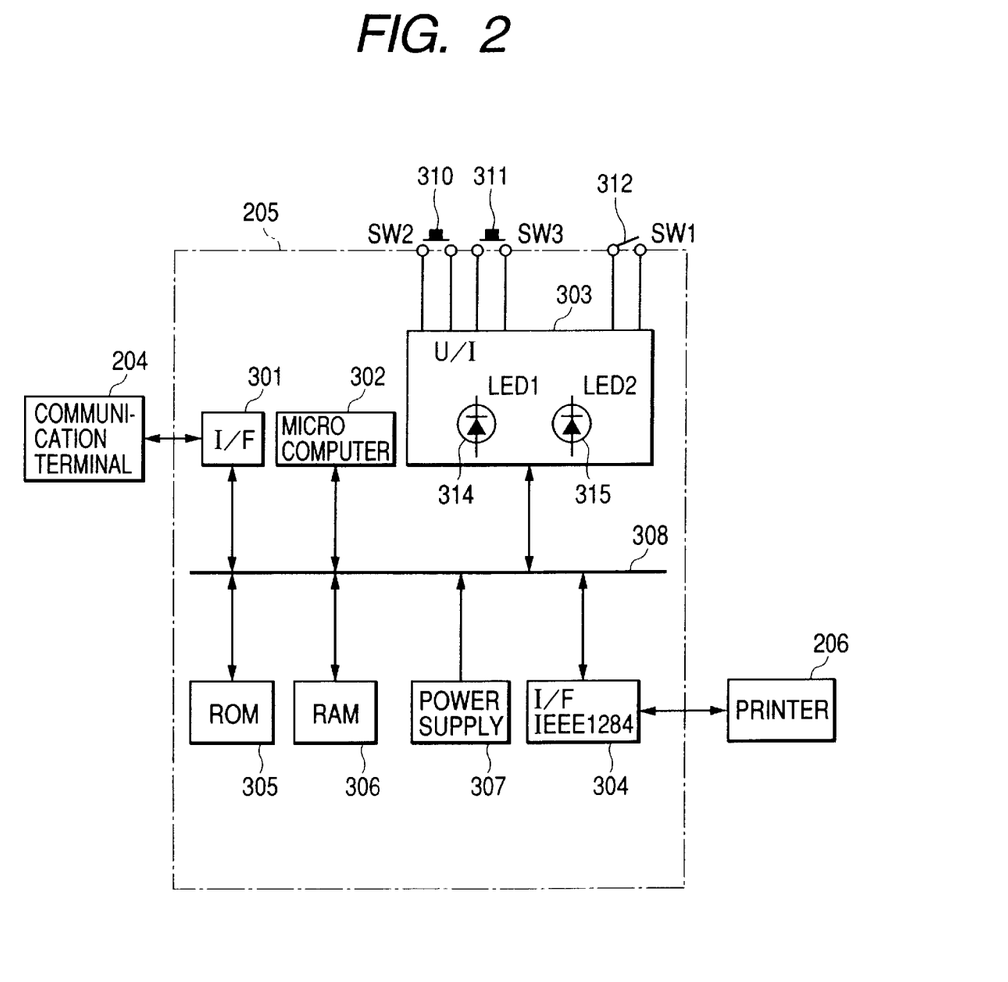
FIG. 2 is a block diagram showing an electrical construction of an adapter 205 in the first embodiment.

FIG. 2 is a block diagram showing an electrical construction of the adapter 205. The adapter 205 is connected to the PHS 204 through a communication terminal interface 301. The communication terminal interface 301 is connected to an internal bus 308. When a different communication terminal is connected, the communication terminal interface 301 absorbs a difference of electric characteristics and is connected to the internal bus 308.

The printer 206 is connected to the internal bus 308 of the adapter 205 through a printer interface 304. In the embodiment, the adapter 205 and printer 206 are connected by the IEEE1284 interface. That is, the adapter 205 converts a protocol of a communication interface of the PHS or the like into a protocol of a Centronics interface of the printer 206.

The following component elements are connected to the internal bus 308: that is, a microcomputer 302 for controlling the whole operation; an ROM 305 as a non-volatile semiconductor memory for storing not only an internal operating program but also set contents such as user information and the like; an RAM 306 for temporarily storing a program execution area and transmission and reception data; and a user interface (U/I) 303 for performing the operation from the user and the display to the user.

A power switch SW1 (312) for controlling the power supply and switches SW2 (310) and SW3 (311) for controlling the PHS 204 and printer 206 are provided for the user interface 303. A 3-color LED1 (314) and a 3-color LED2 (315) provided for the user interface 303 notify the user of a state of the adapter 205.

The microcomputer 302 has a function for realizing a modem and a protocol by software. The power supply 307 uses a battery and an AC adapter as a power source. When the AC adapter is connected to a commercially available AC power source, the AC adapter is preferentially used and an electric power for making the adapter 205 operative is supplied. Either a primary battery or a secondary battery which can be charged by the AC adapter can be used as a battery. A power voltage monitoring circuit is provided for the power supply 307. When an output voltage of the battery is lower than a preset voltage, the microcomputer 302 is allowed to generate an interruption signal via the internal bus 308, thereby notifying the operating program of the low-power voltage. A recovery of the power voltage can be also detected by monitoring the interruption signal.

Figure 3:
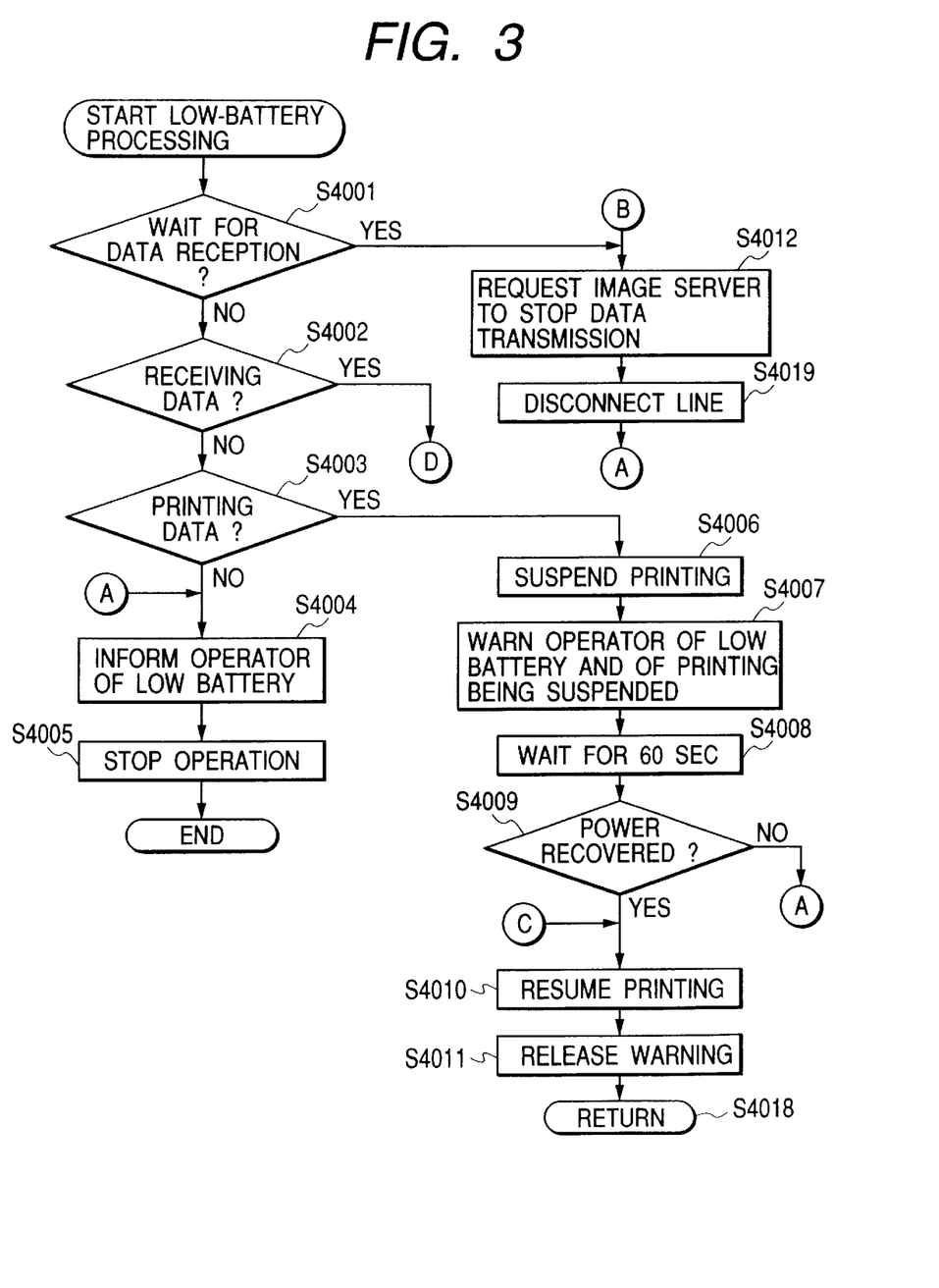
FIG. 3 is a flowchart showing a low-power voltage processing procedure which is activated by an interruption signal from a power supply 307 in the first embodiment.
Figure 4:
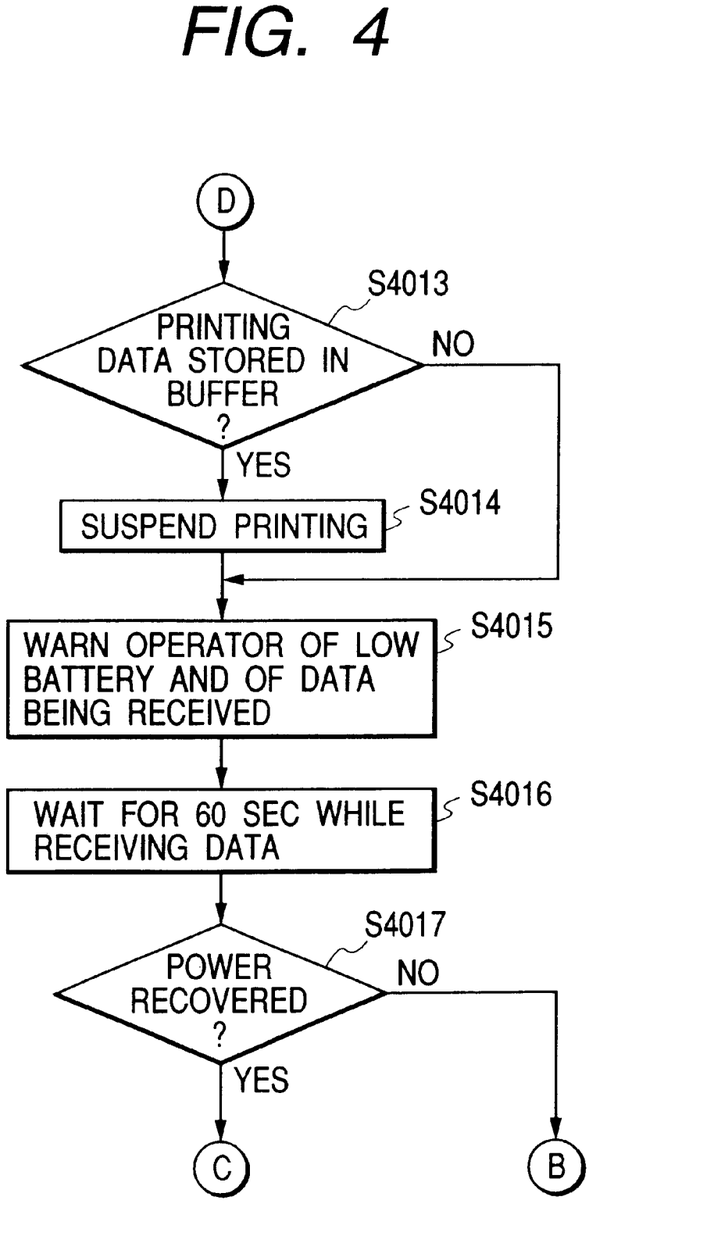
FIG. 4 is a flowchart showing the low-power voltage processing procedure which is activated by the interruption signal from the power supply 307 in the first embodiment and is a sequel to FIG. 3.

FIGS. 3 and 4 are flowcharts showing a low-power voltage processing procedure which is activated by the interruption signal from the power supply 307. The low-power voltage processing program has been stored in the ROM 305 in the adapter 205 and is executed by the microcomputer 302.

First, a state of the operating program at a point when the power voltage drops and the interruption signal is generated is discriminated (steps S4001, S4002, S4003). That is, whether the operating program is in a data reception waiting mode or not is discriminated (step S4001). If it is in the data reception waiting mode, the processing routine advances to a process in step S4012.

If it is not in the data reception waiting mode in step S4001, whether the data is being received or not is discriminated (step S4002). If the data is being received, a process in step S4013 follows. If NO in step S4002, whether the reception of the data has been finished and the system is in a state where the data in the buffer is being printed or not is discriminated (step S4003). If it is being printed, a process in step S4006 follows.

If the data is not being printed in step S4003, it is determined that the system is in an idle mode where it is waiting for the operation of the operator and the LED1 (314) is allowed to flicker in red, thereby notifying the operator of the low-power voltage (step S4004). The system is set into an operation stop mode where only the power switch SW1 (312) can be accepted (step S4005). The processing routine is finished.

If it is determined in step S4001 that the system is waiting for the reception of the data, the image server 201 is requested to stop the transmission of the print data and the system waits for a response (step S4012). By this process, the communication line is not suddenly disconnected due to the low-power voltage but after confirming the stop of the transmission on the image server 201 side and the next line disconnecting process is executed (step S4019). In the process in step S4019, a command is sent to the PHS 204 and the communication line is disconnected, thereby setting the system into a state where the data from the image server 201 is not received. After that, a process in step S4004 follows and the foregoing operation is performed. The system enters an operation stop mode by a process in step S4005.

When the disconnection of the communication line is detected at a point when the image server 201 intends to start communication after the preparation of the print data, the image server 201 cancels a print data transmission JOB to the adapter 205.

If it is determined in step S4002 that the print data from the image server 201 is being received, a process in step S4013 follows. In the process in step S4013, whether the print data stored in the reception buffer is being printed or not is discriminated (step S4013). If NO, step S4015 follows. If the print data is being printed in step S4013, the printing is temporarily suspended (step S4014). The LED1 (314) is lit on in orange, thereby warning the operator of the fact that the receiving operation is being continued irrespective of the low-power voltage (step S4015).

The system waits for 60 seconds while continuing the data reception (step S4016). During this period of time, the printing is suspended to reduce an electric power consumption of the adapter 205. Since it is necessary to keep the connection to the image server 201 even if the printing operation was suspended and since a reduction in electric power consumption due to the continuation of the receiving operation is small, only the receiving operation is continued. During this period of time, if the operator is aware of the low-power voltage and inserts the AC adapter, the power supply is recovered and the printing operation can be continued.

Whether the power voltage has been recovered or not is discriminated by monitoring a level of the interruption signal (step S4017). If the power voltage is not recovered, the process in step S4012 follows and the communication line is disconnected in step S4019. In step S4004, the operator is notified of the line disconnection. The system enters the operation stop mode in step S4005. If it is decided in step S4017 that the power voltage has been recovered, the processing routine advances to a process in step S4010, which will be explained hereinlater.

If it is determined in step S4003 that the printing operation is being executed, the printing is suspended to minimize the electric power consumption (step S4006). The LED1 (314) is lit on in orange, thereby warning the operator of the fact that the printing has been suspended due to the low-power voltage (step S4007). The system waits for 60 seconds (step S4008). During this period of time, if the operator is aware of the low-power voltage and inserts the AC adapter, the power supply is recovered and the communication printing operation can be continued. Whether the power voltage has been recovered or not is discriminated by monitoring the level of the interruption signal (step S4009). If the power voltage is not recovered, the process in step S4004 follows and the operator is notified of such a fact. The system enters the operation stop mode in step S4005.

If it is determined in step S4009 that the power voltage has been recovered, the suspended printing process is resumed (step S4010). The LED1 (314) is returned to the original state and the warning to the operator is released (step S4011). After that, the system is returned to a state at a point when the interruption signal has been generated due to the low-power voltage and the processing routine is finished (step S4018).

Although the waiting time in steps S4008 and S4016 has been set to 60 seconds in the embodiment, it can be set to an arbitrary time so long as it can give a surplus time adapted for inserting the AC adapter to the operator. However, it is improper to set the waiting time to a time such that while the system waits for the insertion of the AC adapter, the power voltage further drops and the microcomputer 302 enters an inoperative mode.

[Second Embodiment]

Figure 5:
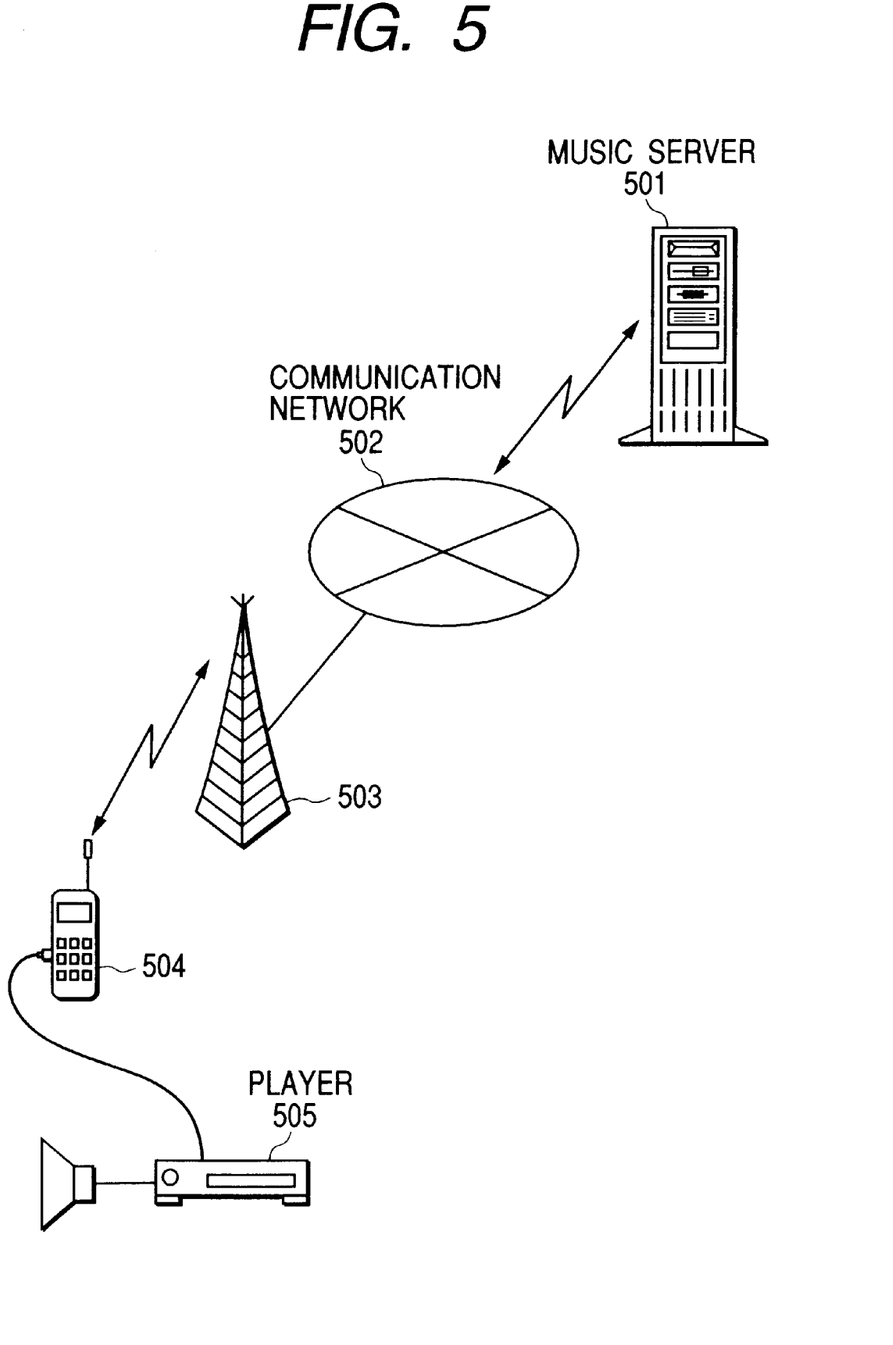
FIG. 5 is a diagram showing a construction of a music distributing system in the second embodiment.

FIG. 5 is a diagram showing a construction of a music distributing system in the second embodiment. In the diagram, reference numeral 501 denotes a music server for distributing music data; 502 a communication network; 503 a radio public telephone network; 504 a PHS as a communication terminal; and 505 a player as a data terminal.

The music distributing system executes services by using the radio public telephone network 503 and PHS 504 so that the user can download desired music pieces in the mobile environment and reproduce them.

The music server has the Web page for providing services, accesses to the Web page from the PDA or the like (not shown) via the PHS and radio public telephone network, selects desired music data, and instructs distribution to the player 505 of the user. The music server 501 searches user information which has previously been registered in the music server 501, obtains a telephone number of the PHS 504 which is connected to the player 505, calls the telephone number, and transmits the selected music data. The player 505 buffers the music data received from the music server 501 through the PHS 504 and stores it into an internal memory device.

Figure 6:
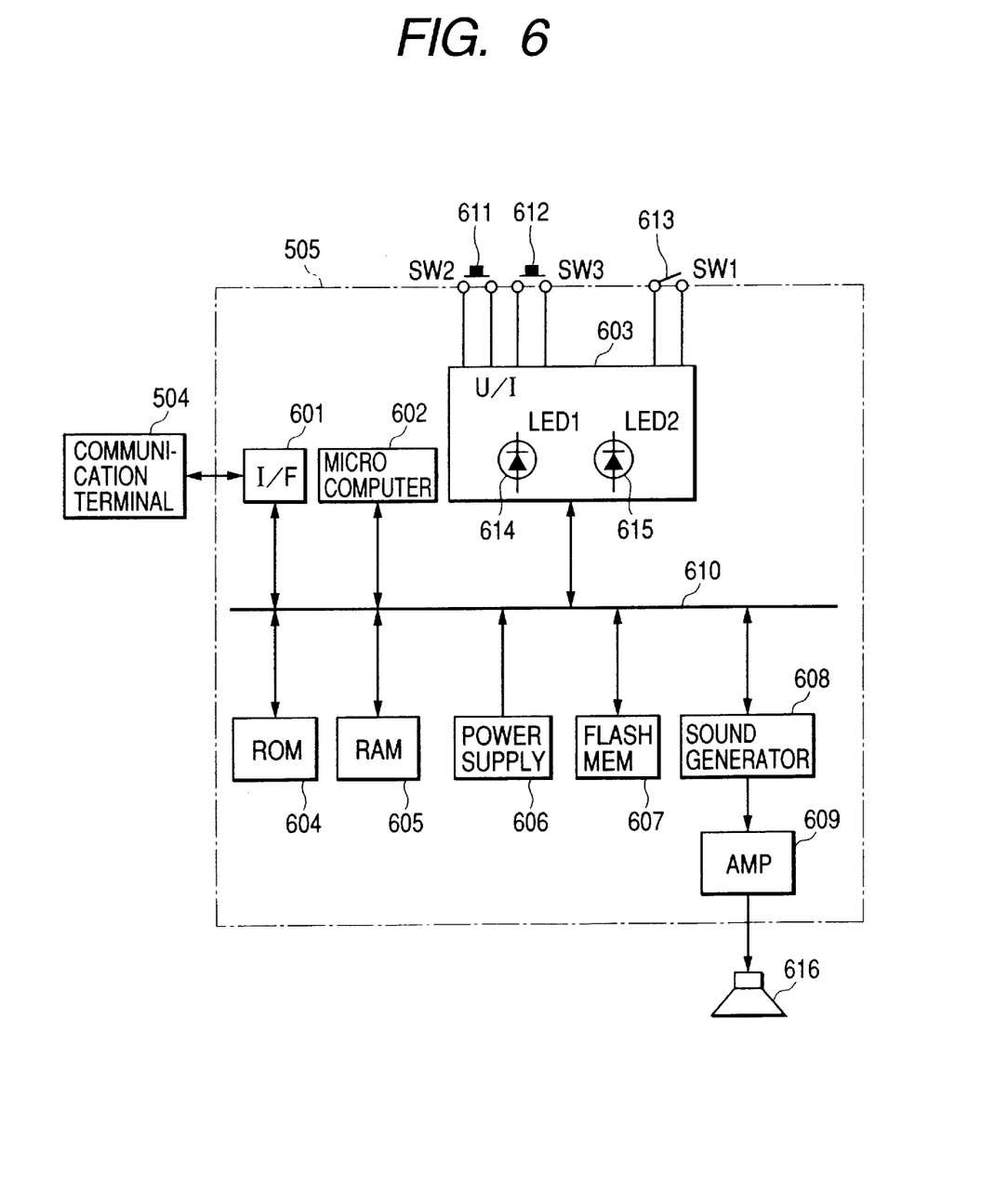
FIG. 6 is a block diagram showing an electrical construction of a player 505 in the second embodiment.

FIG. 6 is a block diagram showing an electrical construction of the player 505. The player 505 is connected to the PHS 504 through a communication terminal interface 601. The communication terminal interface 601 is connected to an internal bus 610. When a different communication terminal is connected, the communication terminal interface 601 absorbs a difference of electric characteristics and is connected to the internal bus 610. A flash memory 607 is a memory device which is connected to the internal bus 610 and stores the received music data. A sound generator 608 is connected to the internal bus 610 and reproduces the stored music data in an analogwise manner on the basis of an instruction from a microcomputer 602. An amplifier 609 is connected to the sound generator 608, amplifies a music signal reproduced by the sound generator 608 in the analogwise manner, and sends it to a speaker 616. That is, the player 505 temporarily stores the music data received via a communication terminal such as a PHS and reproduces it.

The following component elements are connected to the internal bus 610: namely, the microcomputer 602 for controlling the whole operation; an ROM 604 serving as a non-volatile semiconductor memory for storing an internal operating program and storing setting contents such as user information and the like; an RAM 605 for temporarily storing a program execution area and reception data; and a user interface (U/I) 603 for performing the operation from the user and the display to the user.

A power switch SW1 (613) for controlling the power supply and switches SW2 (611) and SW3 (612) for controlling the PHS 504 and the music reproduction are provided for the user interface 603. A 3-color LED1 (614) and a 3-color LED2 (615) provided for the user interface 603 notify the user of a state of the player 505.

The microcomputer 602 has a function for realizing a modem and a music reproduction by software. The power supply 606 uses a battery and an AC adapter as a power source. When the AC adapter is connected to a commercially available AC power source, the AC adapter is preferentially used and an electric power for making the player 505 operative is supplied. Either a primary battery or a secondary battery which can be charged by the AC adapter can be used as a battery. A power voltage monitoring circuit is provided for the power supply 606. When an output voltage of the battery is lower than a preset voltage, the microcomputer 602 is allowed to generate an interruption signal via the internal bus 610, thereby notifying the operating program of the low-power voltage. A recovery of the power voltage can be also detected by monitoring the interruption signal.

The data processing method of the embodiment relates to a data processing method which is executed while the music data is being received from the music server 501 and is not concerned with the processes upon music reproduction. Therefore, only the data processing method upon data reception will be described hereinbelow.

Figure 7:
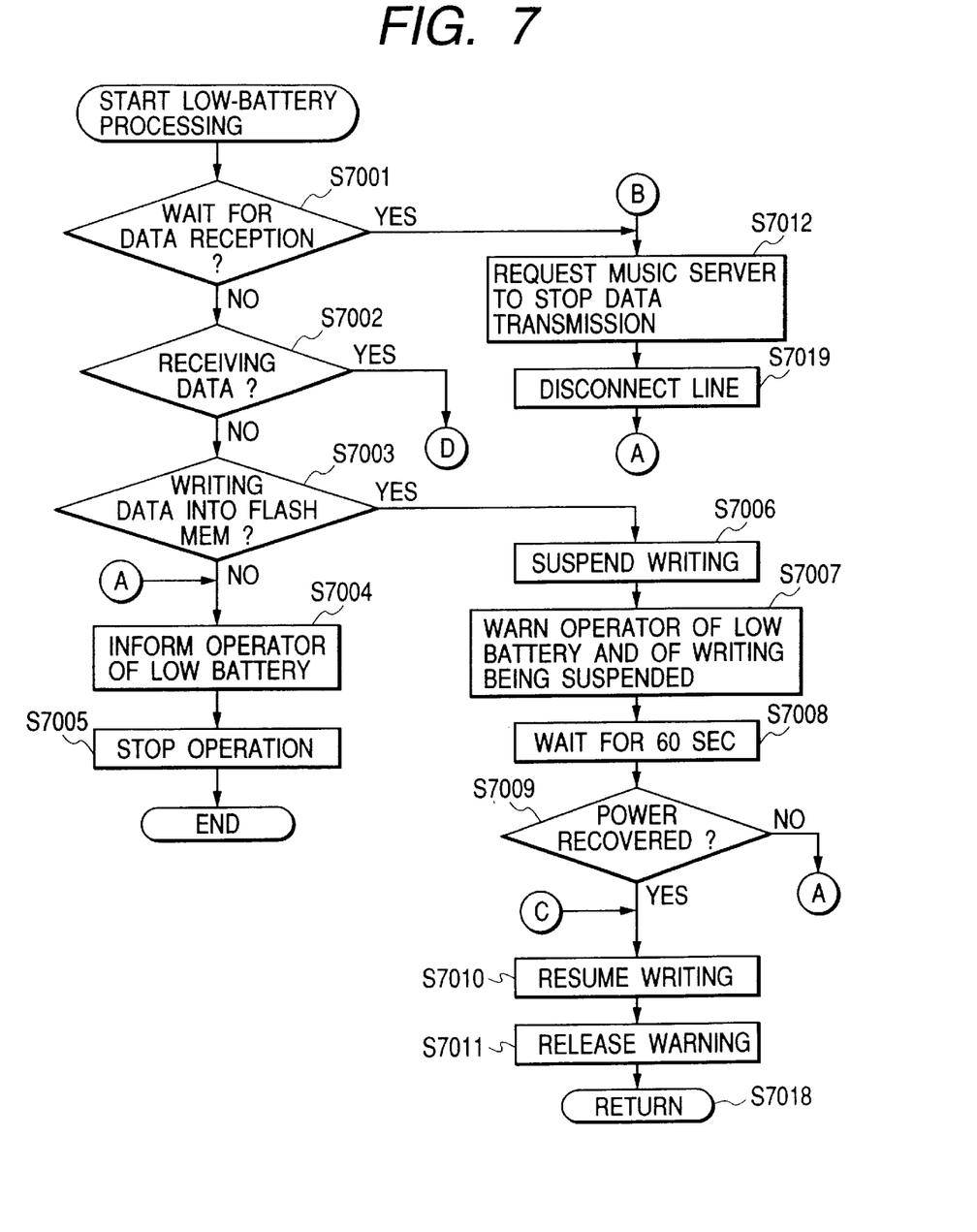
FIG. 7 is a flowchart showing a low-power voltage processing procedure which is activated by an interruption signal from a power supply 606 in the second embodiment.
Figure 8:
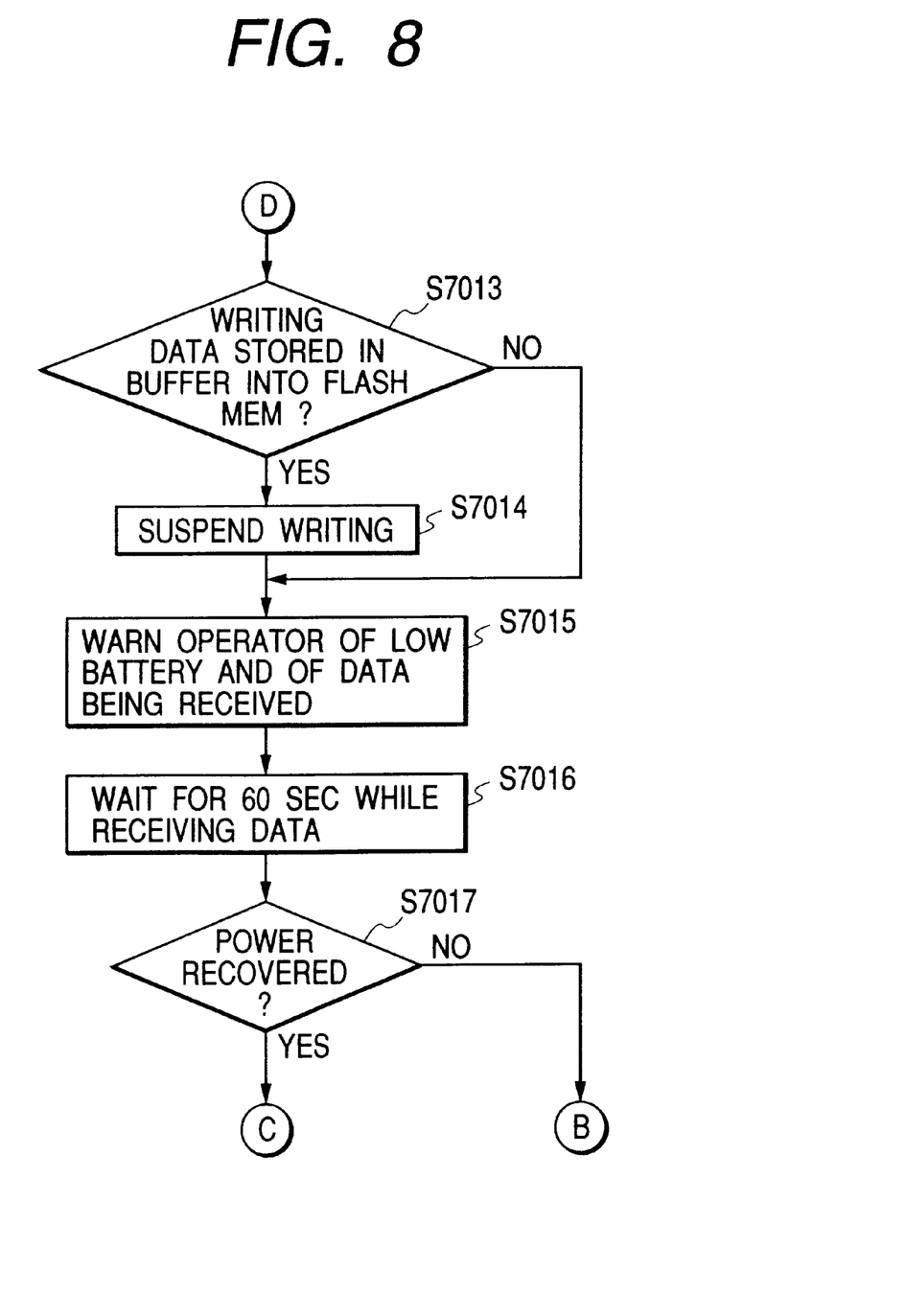
FIG. 8 is a flowchart showing the low-power voltage processing procedure which is activated by the interruption signal from the power supply 606 in the second embodiment and is a sequel to FIG. 7.

FIGS. 7 and 8 are flowcharts showing a low-power voltage processing procedure which is activated by the interruption signal from the power supply 606. The low-power voltage processing program has been stored in the ROM 604 in the player 505 and is executed by the microcomputer 602.

First, a state of the operating program at a point when the power voltage drops and the interruption signal is generated is discriminated (steps S7001, S7002, S7003). That is, whether the operating program is in a data reception waiting mode or not is discriminated (step S7001). If it is in the data reception waiting mode, the processing routine advances to a process in step S7012.

If it is not in the data reception waiting mode in step S7001, whether the data is being received or not is discriminated (step S7002). If the data is being received, a process in step S7013 follows. If NO in step S7002, whether the reception of the data has been finished and the system is in a state where the data in the buffer is being written into the flash memory 607 or not is discriminated (step S7003). If it is being written, a process in step S7006 follows.

If the data is not being written in step S7003, it is determined that the system is in an idle mode where it is waiting for the operation of the operator and the LED1 (614) is allowed to flicker in red, thereby notifying the operator of the low-power voltage (step S7004). The system is set into an operation stop mode where only the power switch SW1 (613) can be accepted (step S7005). The processing routine is finished.

If it is determined in step S7001 that the system is waiting for the reception of the data, the music server 501 is requested to stop the transmission of the music data and the system waits for a response (step S7012). By this process, the communication line is not suddenly disconnected due to the low-power voltage but after confirming the stop of the transmission on the music server 501 side, the next line disconnecting process is executed (step S7019). In the process in step S7019, a command is sent to the PHS 504 and the communication line is disconnected, thereby setting the system into a state where the data from the music server 501 is not received. After that, a process in step S7004 follows and the foregoing operation is performed. The system enters an operation stop mode by a process in step S7005.

When the disconnection of the communication line is detected at a point when the music server 501 intends to start communication after the preparation of transmission of the music data, the music server 501 cancels a music data transmission JOB to the player 505.

If it is determined in step S7002 that the music data from the music server 501 is being received, a process in step S7013 follows. In the process in step S7013, whether the music data stored in the reception buffer is being written into the flash memory 607 or not is discriminated (step S7013). If NO, step S7015 follows. If the music data is being written in step S7013, the writing is temporarily suspended (step S7014). The LED1 (614) is lit on in orange, thereby warning the operator of the fact that the receiving operation is being continued irrespective of the low-power voltage (step S7015).

The system waits for 60 seconds while continuing the data reception (step S7016). During this period of time, the writing into the flash memory 607 is suspended to reduce an electric power consumption of the player 505. Since it is necessary to keep the connection to the music server 501 even if the writing operation was suspended and a reduction in electric power consumption due to the continuation of the receiving operation is small, only the receiving operation is continued. During this period of time, if the operator is aware of the low-power voltage and inserts the AC adapter, the power supply is recovered and the writing operation can be continued.

Whether the power voltage has been recovered or not is discriminated by monitoring a level of the interruption signal (step S7017). If the power voltage is not recovered, the process in step S7012 follows and the communication line is disconnected in step S7019. In step S7004, the operator is notified of the line disconnection. The system enters the operation stop mode in step S7005. If it is decided in step S7017 that the power voltage has been recovered, the processing routine advances to a process in step S7010, which will be explained hereinlater.

If it is determined in step S7003 that the writing operation is being executed, the writing is suspended to minimize the electric power consumption (step S7006). The LED1 (614) is lit on in orange, thereby warning the operator of the fact that the writing has been suspended due to the low-power voltage (step S7007). The system waits for 60 seconds (step S7008). During this period of time, if the operator is aware of the low-power voltage and inserts the AC adapter, the power supply is recovered and the writing operation can be continued. Whether the power voltage has been recovered or not is discriminated by monitoring the level of the interruption signal (step S7009). If the power voltage is not recovered, the process in step S7004 follows and the operator is notified of such a fact. The system subsequently enters the operation stop mode in step S7005.

If it is determined in step S7009 that the power voltage has been recovered, the suspended writing process is resumed (step S7010). The LED1 (614) is returned to the original state and the warning to the operator is released (step S7011). After that, the system is returned to a state at a point when the interruption signal has been generated due to the low-power voltage and the processing routine is finished (step S7018).

Although the waiting time in steps S7008 and S7016 has been set to 60 seconds in the embodiment, it can be set to an arbitrary time so long as it can give a surplus time adapted for inserting the AC adapter to the operator. However, it is improper to set the waiting time to a long time such that while the system waits for the insertion of the AC adapter, the power voltage further drops and the microcomputer 602 enters an inoperative mode.

Although the embodiments of the invention have been described above, the invention is not limited to the constructions of those embodiments but can be also applied to any construction so long as it can accomplish the functions shown in Claims or the functions which the constructions of the embodiments have. For example, in the first embodiment, the PHS 204 for performing a communication control to the radio public telephone network 203 is provided separately from the adapter 205 and the communication control is performed through the communication terminal interface 301 or the like. However, it is also possible to construct the system in a manner such that the communication control function is provided for the adapter itself and the communication network is directly connected to the adapter 205. Further, the adapter 205 can be also constructed integratedly with the printer 206. For instance, by constructing the PHS, adapter, and printer as one apparatus, they can be easily treated. In the second embodiment, the PHS 204 for performing the communication control to the radio public telephone network 203 is provided separately from the player 205 and the communication control is performed through the communication terminal interface 601 or the like. However, it is also possible to construct the system in a manner such that the communication control function is provided for the player itself and the communication network is directly connected to the player 205. In this case, by constructing the PHS and player as one apparatus, they can be easily handled.

Figure 9:
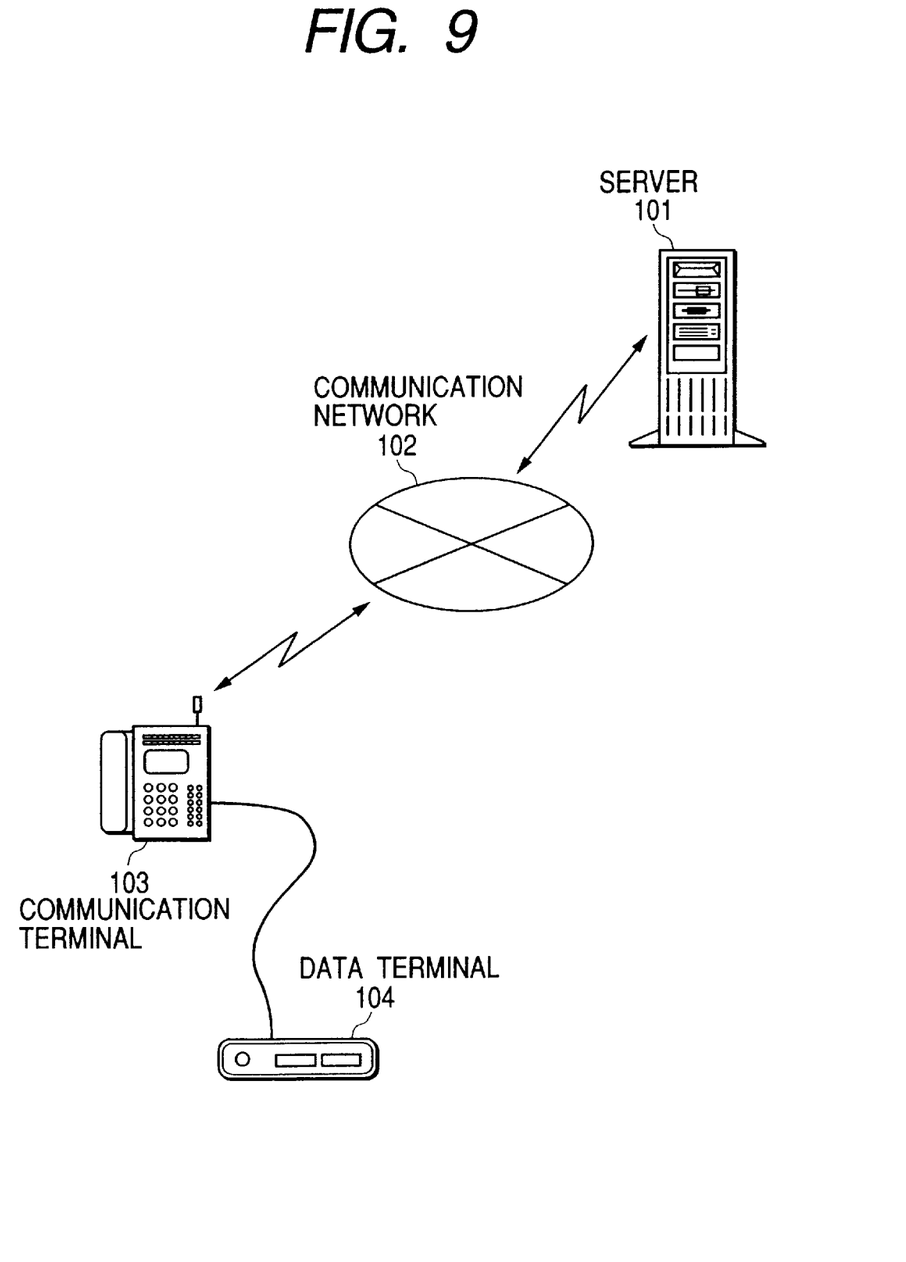
FIG. 9 is a diagram showing a construction of a general data processing system.

Although the cases where the invention is applied to the image distribution printing system and music distributing system have been shown in the embodiments, the data processing system of the invention can be applied to a more general data processing system. FIG. 9 is a diagram showing a construction of the general data processing system. The data processing system comprises: a server 101 for distributing electronic data; a communication network 102 such as public telephone line, ISDN line, wireless line, or the like; a communication terminal 103 connected to the communication network 102; and a data terminal 104 which is connected to the communication terminal 103 and receives the data from the server 101. The data terminal 104 can process the data received from the server 101 and return a processing result to the server 101.

Further, naturally, the invention can be also applied to a case where program codes of software to realize the functions of the embodiments mentioned above are stored into a memory medium and its program is supplied from the memory medium to the apparatus, so that those functions are accomplished. In this case, the program codes themselves read out from the memory medium realize the novel functions of the invention. The program having the program codes and the memory medium in which such a program has been stored also construct the invention.

In the embodiments, program codes for the low-power voltage process shown in the flowcharts of FIGS. 3, 4, 7, and 8 have been stored in the ROM 305 and ROM 604 as memory media.

According to the invention, if the power voltage drops during the internal process of the data terminal which is driven by a battery or during the reception of the data, the operating mode of the data terminal is discriminated. In an environment such that the power voltage is recovered and the operation can be continued, for example, if the system is in an environment such that the AC adapter can be used, by waiting for the recovery of the power supply while executing the least necessary operation by warning the operator of such a fact, the operator can insert the AC adapter and continue the internal process or data reception.

Thus, a situation such that the operation of the data terminal is stopped immediately due to the low-power voltage, and the communication line is suddenly disconnected, so that the operation of the application server is adversely influenced can be prevented. There is no need to receive the data again and a wasteful use of the communication time and a vain consumption of a communication fee due to the reconnection can be eliminated.

As mentioned above, when the power voltage of the data terminal drops, a surplus time suitable for switching the power supply to the AC adapter and continuing the communication without exerting an adverse influence on the information processing apparatus (application server) can be given to the user.

What is claimed is:

1. A data terminal for performing various operations which obtains data via a communication terminal connected to a data server through a network, and forwards the data to an external terminal to process the data, said data terminal comprising:

voltage detecting means for detecting a low-power voltage condition of said data terminal;

warning means for providing a warning at said data terminal if said voltage detecting means detects a low-power voltage condition; and control means for controlling to stop an operation being performed by said data terminal for a predetermined time when a low-power voltage condition is detected by said voltage detecting means, wherein during the predetermined time the network connection is not disconnected.

2. A data terminal according to claim 1, further comprising second voltage detecting means for detecting whether the low-power voltage condition still exists, wherein said control means controls to resume the stopped operation when the low-power voltage condition no longer exists.

3. A data terminal according to claim 1, further comprising:

discriminating means for discriminating a state of operation of said data terminal;

second warning means for providing a warning to the data server through the network if a low-power voltage condition is detected by said voltage detecting means and said discriminating means detect a state indicating said data terminal is waiting for data reception from the data server; and communication control means for controlling to request stopping transmission of data from the data server in accordance with the warning from said second warning means.

4. A data terminal according to claim 1, further comprising:

discriminating means for discriminating a state of operation of said data terminal; and communication control means for maintaining reception of the data from the data server when said discriminating means detects a state indicating said data terminal is receiving data and said voltage detecting means detects a low-power voltage condition.

5. A data terminal according to claim 1, further comprising:

discriminating means for discriminating a state of operation of said data terminal; and communication control means for controlling to stop transmission of data to the external terminal when said discriminating means detect a state indicating transmission of data to the external apparatus and said voltage detecting means detects a low-power voltage condition.

6. A data terminal according to claim 1, further comprising second voltage detection means for detecting whether the low-power voltage condition still exists after the predetermined time has elapsed, wherein said control means controls to resume the stopped operation if the low-power voltage condition no longer exists.

7. A data terminal according to claim 1, further comprising power input means for inputting a spare power supply from an AC adapter.

8. A data processing method of processing data by a data terminal performing various operations which obtains the data via a communication terminal connected to a data server through a network, and forwards the data to an external terminal to process the data, said data processing method comprising the steps of:

detecting a low-power voltage condition of the data terminal providing a warning at the data terminal if a low-power voltage condition is detected in said low-power voltage detection step;

controlling to stop an operation being performed by the data terminal for a predetermined time when a low-power voltage condition is detected in said low-power voltage detection step, wherein during the predetermined time the network condition is not disconnected.

9. A data processing system for controlling a data terminal performing various operations which obtains data via a communication terminal connected to a data server through a network, and forwards the data to an external apparatus to process the data, said data terminal comprising:

voltage detecting means for detecting a low-power voltage condition of said data terminal warning means for providing a warning at said data terminal if said voltage detecting means detects a low-power voltage condition; and controls means for controlling to stop an operation being performed by said data terminal for a predetermined time when a low-power voltage condition is detected by said voltage detecting means, wherein during the predetermined time the network connection is not disconnected.

10. A computer-readable memory medium storing a program for executing a data processing method by a data terminal performing various operations which obtains the data via a communication terminal connected to a data server through a network, and forwards the data to an external terminal to process the data, said program comprises:

code for detecting a low-power voltage condition of the data terminal;

code for providing a warning at the data terminal if a low-power voltage condition is detected by said low-power voltage detection code;

code for controlling to stop an operation being performed by the data terminal for a predetermined time when a low-power voltage condition is detected by said low-power voltage detection code, wherein during the predetermined time the network connection is not disconnected.

11. A computer-readable program comprising code for executing a data processing method by a data terminal performing various operations which obtains the data via a communication terminal connected to a data server through a network, and forwards the data to an external terminal to process the data, said program comprises:

code for detecting a low-power voltage condition of the data terminal;

code for providing a warning at the data terminal if a low-power voltage condition is detected by said low-power voltage detection code;

code for controlling to stop an operation being performed by the data terminal for a predetermined time when a low-power voltage condition is detected by said low-power voltage detection code, wherein during the predetermined time the network connection is not disconnected.

* * * * *

UNITED STATES PATENT AND TRADEMARK OFFICE
CERTIFICATE OF CORRECTION

PATENT NO.     : 6,804,789 B2
DATED          : October 12, 2004
INVENTOR(S)    : Hirokimi Shimizu It is certified that error appears in the above-identified patent and that said Letters Patent is hereby corrected as shown below:

Column 1,
Line 20 "being progressed" should read -- progressing --.

Column 10,
Line 4, "terminal" should read -- terminal; --;
Line 7, "step;" should read -- step; and --;
Line 12, "condition" should read -- connection --;
Line 20, "terminal" should read -- terminal; --;
Line 24, "controls" should read -- control --;
Line 36, "prises:" should read -- prising: --;
Line 41, "code;" should read -- code; and --;
Line 53, "comprises:" should read -- comprising: --; and
Line 58, "code;" should read -- code; and --.

Signed and Sealed this

Third Day of May, 2005

JON W. DUDAS
*Director of the United States Patent and Trademark Office*